3,054,791
10-PIPERAZINOALKYL SUBSTITUTED TRIFLUOROMETHYLPHENOTHIAZINES

Harry Louis Yale, New Brunswick, Francis Alexander Sowinski, Nixon, and Jack Bernstein, New Brunswick, N.J., assignors to Olin Mathieson Chemical Corporation, New York, N.Y., a corporation of Virginia
No Drawing. Filed June 30, 1958, Ser. No. 745,296
6 Claims. (Cl. 260—243)

This invention relates to new 10-[(substituted piperazino)lower alkyl]-trifluoromethyl phenothiazines (and their salts) having valuable therapeutic properties and processes for the preparation thereof.

The therapeutically active compounds of this invention include phenothiazines of the general formula

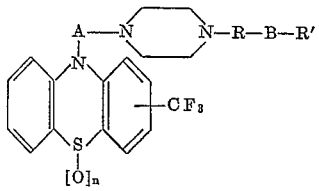

wherein A is lower alkylene; B is selected from the class consisting of —O—, —S— and —$SO_2$—; R is lower alkylene; R' is a hydrocarbon radical of less than 14 carbon atoms; n is zero, one or two; and, salts thereof. Among the suitable hydrocarbon radicals defined by R' may be mentioned lower alkyl (e.g. methyl, ethyl, n-butyl and n-hexyl), lower alkenyl (e.g. vinyl, allyl, pentenyl-4 and hexenyl-1), aralkyl of less than 14 carbon atoms (e.g. benzyl, phenethyl, and benzhydryl), cycloalkyl (e.g. cyclopentyl, cyclohexyl and cyclohexylmethyl), cycloalkenyl (e.g. cyclohexenyl), and aryl of less than 14 carbon atoms (e.g. phenyl, m-tolyl and xylyl).

The terms "lower alkyl" and "lower alkylene," as employed herein, include both straight and branched chain radicals of less than six carbon atoms. The particularly preferred compounds are those wherein the trifluoromethyl group is in the 2-position, n is zero, R' is vinyl and B is —O—.

As to the salts of these phenothiazines, those coming within the purview of this invention include the acid-addition salts, particularly the non-toxic acid-addition salts. Acids useful for preparing the acid-addition salts include, inter alia, inorganic acids, such as the hydrohalic acids (e.g. hydrochloric and hydrobromic acid), sulfuric acid, nitric acid and phosphoric acid; and, organic acids or compounds capable of forming addition salts, such as oxalic, tartaric, citric, acetic, maleic, and succinic acids, and 8-chlorotheophylline.

The compounds of this invention, which are therapeutically active compounds utilizable as sedatives, antihistaminic agents, anti-emetic agents and ataractic, or transquilizing agents may be administered orally (e.g. in capsule, tablet or elixir form) or by injection for the treatment of conditions arising from nervous tensions.

The compounds of this invention can be prepared by interacting a compound of the formula

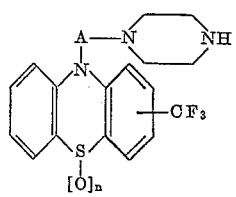

with a compound of the formula X—R—B—R' wherein X is a halogen, particularly chlorine, bromine or iodine, and R, B, R', A and n are as hereinbefore defined.

The compounds of this invention may be converted into or obtained as the corresponding S-monoxide or corresponding 5,5-dioxide. To prepare the S-monoxide, the corresponding 10-substituted piperazino-lower alkyl-trifluoromethylphenothiazine is treated with an equivalent amount of an oxidizing agent such as hydrogen peroxide or a peracid such as peracetic acid. To prepare the corresponding 5,5-dioxides of the compounds of this invention, the desired phenothiazine nucleus, before addition of the 10-substituted piperazino radical and after protection of the 10-nitrogen atom by introduction of a 10-[halo(lower alkyl)] group, is treated with an oxidizing agent to form the 5,5-dioxide, and the resulting 10-[halo-(lower alkyl)]-trifluoromethyl-phenothiazine 5,5-dioxide treated to yield the 10-piperazino-lower alkyl-trifluoromethylphenothiazine final product.

The free bases, when initially formed, can be converted to acid-addition salts by treatment with the desired acid. This reaction is preferably conducted in an inert organic solvent under substantially anhydrous conditions by treating the base with the acid, whereby the acid-addition salt is formed.

The following examples are illustrative, but by no means limitative, of the invention:

EXAMPLE I

*10-{3-[4-(2-Vinyloxyethyl)Piperazino]Propyl}-2-(Trifluoromethyl)Phenothiazine Dimaleate*

(a) 10-(3-CHLOROPROPYL)-2-(TRIFLUOROMETHYL) PHENOTHIAZINE

A mixture of 20 grams of 2-(trifluoromethyl)phenothiazine, 3.5 grams of sodamide, 15.4 grams of trimethylene chlorobromide and 400 ml. of dry toluene is refluxed for 24 hours, filtered, and the filtrate concentrated to dryness to yield a residue containing 10-(3-chloropropyl)-2-(trifluoromethyl)phenothiazine.

(b) 10-(3-PIPERAZINOPROPYL)-2-(TRIFLUOROMETHYL) PHENOTHIAZINE

The residue of (a) is mixed directly with 17.2 grams of anhydrous piperazine, 15 grams of sodium iodide and 300 ml. of methyl ethyl ketone. The mixture is refluxed for twenty-four hours, concentrated from the steam bath and the residue distributed between 300 ml. of 10% hydrochloric acid and 300 ml. of ether to form a three layer system. The two lower layers are treated with an excess of concentrated aqueous sodium hydroxide and the liberated oil extracted into ether.

The dried ether solution is concentrated and the residue distilled to give about 10.6 grams of 10-(3-piperazinopropyl) - 2 - (trifluoromethyl)phenothiazine, B.P. about 208–215° C. (0.08 mm.).

(c) 10-{3-[4-(2-VINYLOXYETHYL)PIPERAZINO]PROPYL}-2-(TRIFLUOROMETHYL)PHENOTHIAZINE

A mixture of 21.2 grams of 10-(3-piperazinopropyl)-2-(trifluoromethyl)phenothiazine, 7.4 grams of anhydrous potassium carbonate, 11 grams of 2-chloroethyl vinyl ether and 50 ml. of dry toluene is stirred and refluxed for nine hours, cooled, diluted with diethyl ether and washed with water. The ether-toluene solution is dried, concentrated and distilled to give about 13.5 grams of the product, B.P. about 242–245° C. (0.5 mm.).

(d) 10 - {3 - [4 - (2 - VINYLOXYETHYL)PIPERAZINE]PROPYL}-2-(TRIFLUOROMETHYL)PHENOTHIAZINE DIMALEATE

The base (13.5 grams) obtained in step (c) is dissolved in 50 ml. of warm acetonitrile, and the resulting solution is then added to a warm solution of 6.7 grams of maleic acid in 50 ml. of acetonitrile. A clear solution forms momentarily and then the salt separates. The mixture is cooled and the solid filtered, and recrystallized twice from methyl ethyl ketone to give the product, M.P. about 165–167° C.

EXAMPLE II

*10 - {3 - [4 - (2 - Diphenylmethyloxyethyl)Piperazino] Propyl}-2-(Trifluoromethyl) Phenothiazine, Dimaleate*

A mixture of 19.8 grams of 10-(3-piperazinopropyl)-2-(trifluoromethyl)phenothiazine, 24.7 grams of diphenylmethyl β-chloroethyl ether, 6.9 grams of anhydrous potassium carbonate, 0.5 gram of sodium iodide and 50 ml. of dry toluene is refluxed and stirred vigorously for twenty-four hours. The reaction mixture is then cooled and filtered, and the filtrate is concentrated under reduced pressure (0.1 mm.) at steam bath temperature. The residue, 10-{3-[4-(2-diphenylmethyloxyethyl)piperazino]propyl}-2-(trifluoromethyl)phenothiazine may be purified by distillation under high vacuum. However the base is sufficiently pure to convert to the desired salts. The residual oil is dissolved in 250 ml. of dry acetonitrile and is added rapidly, with stirring to a solution of 13.4 grams of maleic acid in 100 ml. of dry acetonitrile. The maleic acid salt precipitates almost immediately. The mixture is cooled to complete the precipitation of the salt, filtered and washed with anhydrous ether to give the desired dimaleate of 10-{3-[4-(2-diphenylmethyloxyethyl)piperazino]propyl} - 2 - trifluoromethyl)phenothiazine. The salt may be purified by crystallization from methyl ethyl ketone.

EXAMPLE III

*10 - {3 - [4 - (2 - Benzyloxyethyl)Piperazino]Propyl}- 2-(Trifluoromethyl)Phenothiazine Dimaleate*

By replacing the 24.7 grams of diphenylmethyl β-chloroethyl ether of Example II with 17.1 grams of benzyl β-chloroethyl ether, 10-{3-[4-(2-benzyloxyethyl)-piperazino]proply}-2-(trifluoromethyl)phenothiazine dimaleate results.

EXAMPLE IV

*10 - {3 - [4 - (4 - Benzyloxybutyl)Piperazino]Propyl}- 2-(Trifluoromethyl)Phenothiazine Dimaleate*

By replacing the 24.7 grams of diphenylmethyl β-chloroethyl ether of Example II with 20 grams of benzyl δ-chlorobutyl ether, 10-{3-[4-(4-benzyloxybutyl)piperazino]propyl}-2-(trifluoromethyl)phenothiazine dimaleate is obtained.

EXAMPLE V

*10 - {3 - [4 - (Phenoxymethyl)Piperazino]Propyl} - 2 - (Trifluoromethyl)Phenothiazine Dihydrochloride*

A mixture of 39.5 grams of 10-(3-piperazinopropyl)-2-(trifluoromethyl)phenothiazine, 22 grams α-chloroanisole, 10 grams of anhydrous potassium carbonate, 0.5 gram of potassium iodide and 150 ml. of anhydrous toluene is refluxed for twenty hours. The cooled reaction mixture is filtered, and the filtrate is concentrated under reduced pressure, at steambath temperature, to remove the solvent and excess α-chloroanisole. The residue is then distilled under high vacuum in a molecular still and 10-{3-[4-(phenoxymethyl) - piperazino]propyl} - 2 - (trifluoromethyl)phenothiazine is obtained as a pale yellow viscous oil.

The base is dissolved in 200 ml. of absolute alcohol and to the resulting solution is added 70 ml. of 2.5 N ethereal hydrogen chloride. The dihydrochloride salt precipitates. The precipitation of the dihydrochloride is completed by the addition of anhydrous ether. The solid is then filtered off and crystallized from methyl ethyl ketone to give the desired dihydrochloride of 10-{3-[4-(phenoxymethyl)piperazino]propyl} - 2 - (trifluoromethyl)phenothiazine.

EXAMPLE VI

*10 - {3 - [4 - (2 - Phenoxyethyl)Piperazino]Propyl} - 2-(Trifluoromethyl)Phenothiazine Dihydrochloride*

By replacing the 22 grams of α-chloroanisole of Example V with 30 grams of β-bromophenetole, 10-{3-[4-(2-phenoxyethyl)piperazino]propyl} - 2 - (trifluoromethyl)-phenothiazine dihydrochloride results.

EXAMPLE VII

*10 - {3 - [4 - (2 - Ethylsulfonylethyl)Piperazino]Propyl}- 2-(Trifluoromethyl)Phenothiazine Dimaleate*

To a well-stirred mixture of 19.8 grams of 10-(3-piperazinopropyl)-2-(trifluoromethyl)phenothiazine, 6.9 grams of potassium carbonate, 0.5 gram of potassium iodide and 0.5 gram of copper bronze in 100 ml. of dry toluene, there is added dropwise, over the course of two hours, a solution of 15.7 grams of 2-ethylsulfonylethyl chloride in 50 ml. of dry toluene. After the addition is completed, the reaction mixture is heated to reflux for sixteen hours with continual stirring. The reaction mixture is then cooled and filtered. The residue is washed with 50 ml. of dry toluene; the filtrate and washings are combined and concentrated under reduced pressure (0.3 mm.) from an oil bath at 140° C.

The residue of 10-{3-[4-(2-ethylsulfonylethyl)piperazino]propyl}-2-(trifluoromethyl)phenothiazine distills with decomposition under reduced pressure. The undistilled base, however, is of high purity and can be converted directly to the dimaleate. To a solution of the undistilled base in 100 ml. of acetonitrile is added a warm solution of 11.6 g. of maleic acid in 150 ml. of acetonitrile. The maleic acid salt separates as a crystalline solid which is filtered and recrystallized from absolute ethanol.

EXAMPLE VIII

*10 - {3 - [4 - (Ethylsulfonylmethyl)Piperazino]Propyl}- 2-(Trifluoromethyl)Phenothiazine Dimaleate*

By substituting 14.3 grams of 2-ethylsulfonylmethyl chloride for the 15.7 grams of 2-ethylsulfonylethyl chloride of Example VII, 10-{3-[4-(ethylsulfonylmethyl)-piperazino]propyl}-2-(trifluoromethyl)phenothiazine dimaleate results.

EXAMPLE IX

*10 - {3 - [4 - (Phenylsulfonylmethyl)Piperazino]Propyl}- 2-(Trifluoromethyl)Phenothiazine Dimaleate*

By substituting 19.1 grams of phenylsulfonylmethyl chloride for the 15.7 grams of 2-ethylsulfonylethyl chloride of Example VII, 10-{3-[4-(phenylsulfonylmethyl)-piperazino]-propyl}-2-(trifluoromethyl)phenothiazine dimaleate results.

EXAMPLE X

*10-{3-[4-(2-Methoxyethyl)Piperazino]Propyl}-2-Trifluoromethyl)Phenothiazine Dihydrochloride*

To a stirred mixture of 9.9 grams of 10-(3-piperazinopropyl)-2-(trifluoromethyl)phenothiazine, 3.5 grams of potassium carbonate, 0.5 gram of potassium iodide and 0.5 gram of copper bronze in 50 ml. of dry benzene, is added dropwise a solution of 4.8 grams of methyl 2-chloroethyl ether in 25 ml. of dry benzene. Subsequently, the mixture is stirred for twenty-four hours at an internal temperature of 65° C., cooled and filtered. The filtrate is concentrated in vacuo; the residual oil is dissolved in 200 ml. of anhydrous ether, the solution is cooled in ice and treated dropwise, with stirring, with 18 ml. of a 2.8 N ethereal hydrogen chloride solution. The crude salt is recrystallized from acetonitrile to give 10-{3-[4-(2-methoxyethyl)piperazino]propyl} - 2 - (trifluoromethyl)phenothiazine dihydrochloride as a white microcrystalline powder.

EXAMPLE XI

*10-{3-[4-(4-Methoxybutyl)Piperazino]Propyl}-2-(Trifluoromethyl)Phenothiazine Dihydrochloride*

Following the procedure of Example VII but for the substitution of 12.3 grams of methyl 4-chlorobutyl ether for the 15.7 grams of 2-ethylsulfonylethyl chloride and the use of ethyl alcohol as the solvent for the reaction, 10-{3-[4-(4-methoxybutyl)piperazino]propyl} - 2 - (trifluoromethyl)-phenothiazine dihydrochloride is prepared.

EXAMPLE XII

*10-{3-[4-(n-Butoxymethyl)Piperazino]Propyl}-2-(Trifluoromethyl)Phenothiazine Dihydrochloride*

By using 12.3 grams of n-butyl chloromethyl ether in place of the 15.7 grams of 2-ethylsulfonylethyl chloride of Example VII, 10-{3-[4-(n-butoxymethyl)piperazino] propyl} - 2 - (trifluoromethyl)phenothiazine dihydrochloride is prepared.

EXAMPLE XIII

*10-{3-[4-(Allyloxymethyl)Piperazino]Propyl}-2-Trifluoromethyl)Phenothiazine*

By substituting 11 grams of allyl chloromethyl ether for the 11 grams of 2-chloroethyl vinyl ether in Example I(c), 10-{3-[4-(allyloxymethyl)piperazino]propyl}-2-trifluoromethyl)phenothiazine is obtained.

EXAMPLE XIV

*10-{3-[4-(2-Ethylmercaptoethyl)Piperazino]Propyl}-2-(Trifluoromethyl)Phenothiazine Dimaleate*

A stirred mixture of 19.8 grams of 10-(3-piperazinopropyl)-2-(trifluoromethyl)phenothiazine, 6.9 grams of potassium carbonate, 0.5 gram of potassium iodide, 0.5 gram of copper bronze and 50 ml. of dry toluene is added dropwise to a solution of 12.5 grams of 2-chloroethyl ethyl sulfide in 25 ml. of dry toluene; subsequently the mixture is stirred and refluxed for about sixteen hours, cooled, and then filtered. The filtrate is concentrated in vacuo from the steam bath. The undistilled residue in 250 ml. acetonitrile is added rapidly to a solution of 13.4 grams of maleic acid in 100 ml. of acetonitrile. The mixture is cooled and filtered to give 10-{3-[4-(2-ethylmercaptoethyl)-piperazino]propyl} - 2 - (trifluoromethyl) phenothiazine dimaleate.

EXAMPLE XV

*10-{3-[4-(2-Methylmercaptoethyl)Piperazino]Propyl}-2-(Trifluoromethyl)Phenothiazine Dimaleate*

By using 11.1 grams of 2-chloroethyl methyl sulfide in place of the 12.5 grams of 2-chloroethyl ethyl sulfide of Example XIV, 10-{3-[4-(2-methylmercaptoethyl)piperazino]-propyl}-2-(trifluoromethyl)phenothiazine dimaleate is obtained.

EXAMPLE XVI

*10-{3-[4-(2-Vinyloxyethyl)Piperazino]Propyl}-2-(Trifluoromethyl)Phenothiazine, 5-Oxide Dihydrochloride*

A mixture of 6 grams of 10-{3-[4-(2-vinyloxyethyl)-piperazino]propyl}-2-(trifluoromethyl)phenothiazine, 100 ml. of absolute ethanol and 5.7 grams of 30% hydrogen peroxide is refluxed for 24 hours, the solution is concentrated and the residue cooled and dissolved in 100 ml. of anhydrous ether. To the cooled ether solution is added dropwise, with stirring and cooling, 20 ml. of 1.8 N etheral hydrogen chloride. The product, 10-{3-[4-(2-vinyloxyethyl)piperazino]propyl} - 2 - (trifluoromethyl) phenothiazine, 5-oxide dihydrochloride separates in quantitative yield.

EXAMPLE XVII

*10-{3-[4-(2-Vinyloxyethyl)Piperazino]Propyl}-2-(Trifluoromethyl)Phenothiazine, 5,5-Dioxide, Dimaleate*

(a) 10-(3-CHLOROPROPYL)-2-(TRIFLUOROMETHYL) PHENOTHIAZINE, 5,5-DIOXIDE

A mixture of 34.4 grams of 10-(3-chloropropyl)-2-(trifluoromethyl)phenothiazine, 300 ml. of glacial acetic acid and 35 ml. of 30% hydrogen peroxide is warmed gradually until reaction is initiated; the source of heat is removed and the spontaneous reaction allowed to run its course. Subsequently, the mixture is refluxed for four hours, and concentrated under reduced pressure. The residual product is 10-(3-chloropropyl)-2-(trifluoromethyl)phenothiazine, 5,5-dioxide.

(b) 10-(3-PIPERAZINOPROPYL)-2-(TRIFLUOROMETHYL)-PHENOTHIAZINE, 5,5-DIOXIDE

The product from (a) is dissolved in 500 ml. of methyl ethyl ketone and to the solution is added 17.2 grams of anhydrous piperazine and 15 grams of sodium iodide. The mixture is stirred and refluxed for twenty-four hours and then concentrated to dryness. The residue, consisting of a semi-solid mass is stirred thoroughly with a mixture of 600 ml. of 10% aqueous hydrochloric acid and 600 ml. of ether; the ether layer is then separated, the acid layer cooled and treated with an excess of 40% aqueous sodium hydroxide. The alkaline solution is then extracted with chloroform; the chloroform solution is dried and concentrated to give 10-(3-piperazinopropyl)-2-(trifluoromethyl)phenothiazine, 5,5-dioxide. The yield is about 27.5 grams.

(c) 10-{3-[4-(2-VINYLOXYETHYL)PIPERAZINO]PROPYL}-2-(TRIFLUOROMETHYL)PHENOTHIAZINE, 5,5-DIOXIDE

The product from (b) (27 grams), 100 ml. of dry toluene, 8.4 grams of anhydrous potassium carbonate, 0.5 gram of potassium iodide, 0.5 gram of copper bronze and 15 grams of β-chloroethylvinyl ether are stirred and refluxed for eighteen hours. The hot mixture is filtered with the use of a filter aid and the filtrate concentrated to dryness. The residue is dissolved in 100 ml. of acetonitrite and to this solution is added a solution fo 14.0 grams of maleic acid in 150 ml. of acetonitrile. The crystalline product which separates is 10-{3-[4-(2-vinyloxyethyl)piperazino]propyl} - 2 - (trifluoromethyl)phenothiazine, 5,5-dioxide, dimaleate. It is purified by recrystallization from absolute ethanol.

EXAMPLE XVIII

*10-{3-[4-(2-Vinyloxyethyl)Piperazino]Propyl}-4-(Trifluoromethyl)Phenothiazine*

(a) 10-(3-CHLOROPROPYL)-4-(TRIFLUOROMETHYL) PHENOTHIAZINE

A mixture of 53.4 grams of 4-(trifluoromethyl)phenothiazine, 6.8 grams of sodamide, 1.0 liter of dry toluene and 35 grams of trimethylene chlorobromide is stirred and refluxed for eighteen hours. The cooled mixture is filtered and the filtrate concentrated to dryness. The residue weighs about 54 grams and consists of 10-(3-chloropropyl)-4-(trifluoromethyl)phenothiazine.

(b) 10-(3-PIPERAZINOPROPYL)-4-(TRIFLUOROMETHYL)-PHENOTHIAZINE

The product from (a) (34 grams), 500 ml. of methyl ethyl ketone, 15 grams of sodium iodide and 17.2 grams of anhydrous piperazine are stirred and refluxed for twenty-four hours and the mixture washed up as in Example I(b) to give about 32 grams of 10-(3-piperazinopropyl)-4-(trifluoromethyl)phenothiazine.

(c) 10-{3-[4-(2-VINYLOXYETHYL)PIPERAZINO]PROPYL}-4-(TRIFLUOROMETHYL)PHENOTHIAZINE

The product from (b) (21.8 grams), 10.7 g. of β-chloroethyl vinyl ether, 100 ml. of dry toluene, 13.8 grams of anhydrous potassium carbonate, 0.5 gram of potassium iodide and 0.5 gram of copper bronze are stirred and refluxed for twenty-four hours. The hot mixture is filtered and the filtrate concentrated under reduced pressure. The residual oil consists of 10-{3-[4-(2-vinyloxyethyl)-piperazino]propyl}-4-(trifluoromethyl)phenothiazine.

EXAMPLE XIX

*10-{2-[4-(2-Vinyloxyethyl)Piperazino]Ethyl}-2-(Trifluoromethyl)Phenothiazine Dimaleate*

(a) 10-(2-CHLOROETHYL)-2-(TRIFLUOROMETHYL) PHENOTHIAZINE

A mixture of 26.7 grams of 2-(trifluoromethyl)phenothiazine, 4.3 grams of sodamide, 17.9 grams of 1-bromo-2-chloroethane and 400 ml. of dry toluene is stirred and refluxed for about twenty-four hours. The reaction mixture is then filtered and the filtrate concentrated under reduced pressure to give about 20 grams of 10-(2-chloroethyl)-2-(trifluoromethyl)phenothiazine.

(b) 10-(2-PIPERAZINOETHYL)-2-(TRIFLUOROMETHYL) PHENOTHIAZINE

The product from (a) (20 grams), 500 ml. of methyl ethyl ketone, 9 grams of sodium iodide and 15 grams of anhydrous piperazine are stirred and refluxed for seventeen hours. After filtering, the reaction mixture is concentrated and the residue taken up in 500 ml. of 10% aqueous hydrochloric acid. The acid solution is then extracted with ether. The aqueous layer is separated, cooled and treated with an excess of 10% aqueous sodium hydroxide solution. The liberated oil is then extracted with ether, the ether extracts are concentrated and the residue distilled in vacuo to yield about 12.5 grams of 10-(2-piperazinoethyl)-2-(trifluoromethyl)phenothiazine, as a yellow oil.

(c) 10-{2-[4-(2-VINYLOXYETHYL)PIPERAZINO]ETHYL}-2-(TRIFLUOROMETHYL)PHENOTHIAZINE

The product from (b) (12.5 grams), 16 grams of β-chloroethyl vinyl ether, 7.7 grams of anhydrous potassium carbonate, 0.5 gram of sodium iodide and 50 ml. of dry toluene is refluxed and stirred for twenty-four hours. The cooled reaction mixture is filtered, the filtrate is concentrated under reduced pressure and the residue, 10-{2-[4 - (2 - vinyloxyethyl)piperazino]ethyl} - 2 - (trifluoromethyl)penothiazine purified by distillation in high vacuum. The yield is about 16 grams.

(d) 10-{2-[4-(2-VINYLOXYETHYL)PIPERAZINO]ETHYL}-2-(TRIFLUOROMETHYL)PHENOTHIAZINE DIMALEATE

The material from (c) in 100 ml. of dry acetonitrile is treated with a solution of 8.4 grams of maleic acid in 100 ml. of acetonitrile. The crystalline maleic acid salt separates, is filtered with suction and is recrystallized from methyl ethyl ketone.

The invention may be variously otherwise embodied within the scope of the appended claims.

What is claimed is:
1. 10-[4-(lower alkenylmercapto-lower alkylene)piperazino-(lower alkylene)] - 2 - (trifluoromethyl)phenothiazine.
2. 10-[4-(lower alkenylsulfonyl-lower alkylene)piperazino-(lower alkylene)-2-(trifluoromethyl)phenothiazine.
3. 10-[4-(lower alkenyloxy-lower alkylene)piperazino-(lower alkylene)] - 2 - (trifluoromethyl)phenothiazine-5-oxide.
4. 10 - {3 - [4 - (2 - vinyloxyethyl)piperazino]propyl}-2-(trifluoromethyl)phenothiazine 5-oxide.
5. 10-[4-(lower alkenyloxy-lower alkylene)piperazino-(lower alkylene)]-2-(trifluoromethyl)phenothiazine 5,5-dioxide.
6. 10 - {3 - [4 - (2 - vinyloxyethyl)piperazino]propyl}-2-(trifluoromethyl)phenothiazine 5,5-dioxide.

References Cited in the file of this patent

UNITED STATES PATENTS

| | | |
|---|---|---|
| 2,766,235 | Cusic | Oct. 9, 1956 |
| 2,838,507 | Cusic | June 10, 1958 |
| 2,860,138 | Sherlock et al. | Nov. 11, 1958 |
| 2,921,069 | Ullyot | Jan. 12, 1960 |
| 2,928,767 | Gulesich et al. | Mar. 15, 1960 |

OTHER REFERENCES

Lowy et al.: An Introduction to Organic Chemistry, 6th ed., page 213 (1945).

Bergmann: The Chemistry of Acetylene and Related Compounds, page 80, Interscience Publishers, Inc., N.Y., (1948).

Craig et al.: J. Org. Chem., Vol. 22, pp. 709–711 (1957).